US009836296B2

(12) United States Patent  (10) Patent No.: US 9,836,296 B2
Vandikas et al.  (45) Date of Patent: Dec. 5, 2017

(54) METHODS AND SYSTEMS FOR PROVIDING UPDATES TO AND RECEIVING DATA FROM DEVICES HAVING SHORT RANGE WIRELESS COMMUNICATION CAPABILITIES

(71) Applicant: Telefonaktiebolaget L M Ericsson (publ), Stockholm (SE)

(72) Inventors: Konstantinos Vandikas, Solna (SE); Elena Fersman, Stockholm (SE); Rafia Inam, Vasteras (SE); Leonid Mokrushin, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/736,842

(22) Filed: Jun. 11, 2015

(65) Prior Publication Data

US 2016/0364223 A1 Dec. 15, 2016

(51) Int. Cl.
*G06F 9/44* (2006.01)
*G06F 9/445* (2006.01)
*H04L 29/08* (2006.01)
*H04W 4/00* (2009.01)
(Continued)

(52) U.S. Cl.
CPC ........... *G06F 8/65* (2013.01); *G06Q 20/3825* (2013.01); *G06Q 20/3829* (2013.01); *H04L 67/34* (2013.01); *H04W 4/008* (2013.01); *H04W 8/005* (2013.01)

(58) Field of Classification Search
CPC .... G06F 8/65; G06F 20/3825; G06F 20/3829; H04L 67/34; H04W 4/008; H04W 8/005

USPC ....... 717/168, 171, 172, 173, 174, 175, 176, 717/177, 178
See application file for complete search history.

(56) References Cited

U.S. PATENT DOCUMENTS 7,716,276 B1* 5/2010 Ren .......................... G06F 8/65
 455/418
9,141,379 B2* 9/2015 Boden ................. G06F 11/3676
(Continued)

OTHER PUBLICATIONS

NPL—Bourk-Discovery—WO—2008, "Bluetooth Special Interest Group Discovery White paper", 2008.*
(Continued)

*Primary Examiner* — Hossain Morshed
(74) *Attorney, Agent, or Firm* — Patent Portfolio Builders, PLLC

(57) ABSTRACT

A method for providing a software update package (SUP) to an Internet of Things (IoT) device via a user's communication device (UCD) is disclosed. In some embodiments, the method includes the UCD automatically discovering that a SUP needs to be provided to the IoT device. The UCD obtains the needed SUP from a software administration server (SAS). The UCD transmits the SUP to the IoT device using a first short range wireless signal. After transmitting the SUP to the IoT device, the UCD receives confirmation data transmitted wirelessly by the IoT device using a second short range wireless signal. The confirmation data confirms that the IoT device received the SUP. The UCD transmits the confirmation data to the SAS. The SAS may verify the confirmation data and, if verified, provide a reward to the user of the UCD. In this way, crowd sourcing can be used to provide SUPs to many IoT devices.

13 Claims, 6 Drawing Sheets

(51) Int. Cl.
*G06Q 20/38* (2012.01)
*H04W 8/00* (2009.01)

(56) References Cited

U.S. PATENT DOCUMENTS

| | | | | |
|---|---|---|---|---|
| 2003/0088651 | A1* | 5/2003 | Wilson, Jr. | G06F 8/65 709/221 |
| 2005/0144529 | A1* | 6/2005 | Gotz | G06F 11/3684 714/38.1 |
| 2006/0212865 | A1* | 9/2006 | Vincent | G06F 8/65 717/168 |
| 2007/0090996 | A1* | 4/2007 | Wang | H04L 67/12 342/463 |
| 2007/0204002 | A1* | 8/2007 | Calderone | G06Q 30/02 709/217 |
| 2007/0279379 | A1* | 12/2007 | Stefanik | G06F 8/61 345/156 |
| 2008/0040713 | A1* | 2/2008 | Subbakrishna | G06F 8/65 717/173 |
| 2008/0287144 | A1* | 11/2008 | Sabata | H04L 67/12 455/456.6 |
| 2008/0300919 | A1* | 12/2008 | Charlton | G06Q 50/22 705/2 |
| 2009/0027227 | A1* | 1/2009 | Wilson | E21B 47/12 340/853.2 |
| 2009/0265140 | A1* | 10/2009 | Murias | G01V 1/223 702/188 |
| 2010/0070966 | A1* | 3/2010 | Perng | G06F 8/60 717/173 |
| 2010/0095293 | A1* | 4/2010 | O'Neill | G06F 8/65 717/173 |
| 2011/0304425 | A1* | 12/2011 | Iyer | H04L 9/3247 340/5.8 |
| 2012/0063397 | A1* | 3/2012 | Abedi | H04W 72/1205 370/329 |
| 2012/0096451 | A1* | 4/2012 | Tenbarge | G06F 11/1433 717/170 |
| 2013/0125108 | A1* | 5/2013 | Pawar | G06F 8/665 717/171 |
| 2013/0283256 | A1* | 10/2013 | Proud | H01F 38/14 717/172 |
| 2014/0052832 | A1* | 2/2014 | Dina | B23K 9/1087 709/221 |
| 2014/0068587 | A1* | 3/2014 | Krishna | G06F 8/65 717/169 |
| 2014/0068592 | A1* | 3/2014 | Chitre | G06F 8/65 717/171 |
| 2014/0137191 | A1* | 5/2014 | Goldsmith | H04L 63/08 726/3 |
| 2014/0201712 | A1* | 7/2014 | Boden | G06F 11/3684 717/124 |
| 2014/0380055 | A1* | 12/2014 | Blanchard | H04L 9/0891 713/171 |
| 2015/0106616 | A1* | 4/2015 | Nix | H04W 52/0235 713/156 |
| 2015/0128123 | A1* | 5/2015 | Eling | G06F 8/67 717/171 |
| 2015/0169312 | A1* | 6/2015 | Patel | G06F 8/20 717/170 |
| 2015/0264574 | A1* | 9/2015 | Dong | G10L 17/00 455/411 |
| 2016/0036814 | A1* | 2/2016 | Conrad | H04L 63/0876 713/171 |
| 2016/0036956 | A1* | 2/2016 | Debates | H04M 1/72525 455/419 |
| 2016/0048580 | A1* | 2/2016 | Raman | G06Q 50/10 707/737 |
| 2016/0049017 | A1* | 2/2016 | Busse | G07C 5/0858 701/33.3 |
| 2016/0072891 | A1* | 3/2016 | Joshi | G05D 23/1393 370/254 |
| 2016/0098266 | A1* | 4/2016 | Martin | G06F 8/665 717/171 |
| 2016/0100035 | A1* | 4/2016 | Martis | H04L 67/34 709/203 |
| 2016/0129185 | A1* | 5/2016 | Ludolph | A61M 5/172 604/506 |
| 2016/0180368 | A1* | 6/2016 | Booth | G06Q 30/0226 705/14.27 |
| 2016/0196132 | A1* | 7/2016 | Searle | H04L 41/082 717/173 |

OTHER PUBLICATIONS

Bourk, Titile "Bluetooth Discovery Whitepaper", 2008, Bluetooth Special Interest Group, p. 4.*
Bourk, "Discovery Whitepaper Service Discovery Applications", 2008, Bluetooth Special Interest Group.*

* cited by examiner

METHODS AND SYSTEMS FOR PROVIDING UPDATES TO AND RECEIVING DATA FROM DEVICES HAVING SHORT RANGE WIRELESS COMMUNICATION CAPABILITIES

TECHNICAL FIELD

Aspects of this disclosure relate to methods and system for updating devices (e.g., appliances or other devices) having short range wireless communication capabilities, and methods and system for obtaining data collected by such devices.

BACKGROUND

The Internet of Things (IoT) is a scenario in which devices are provided with unique identifiers and the ability to transfer data. This scenario is starting to become a reality as more and more devices (e.g., appliances, such as remote sensor, domestic appliances, and other pieces of equipment designed to perform one or more tasks) have unique identifiers and the ability to communicate wirelessly with other devices. Such devices are referred to herein as "IoT devices."

Some predict that in the near future massive amounts of IoT devices will deployed practically everywhere. These IoT devices, like other devices, will need to be managed and maintained. One aspect of maintaining an IoT device is making sure that the IoT device is updated as needed. That is, an aspect of IoT device maintenance is providing a software update package (SUP) to the IoT device when needed, which SUP may comprise one or more of: software/firmware upgrades, new or updated configuration files, new applications, or other new/updated data that would be beneficial to provide to the IoT device.

SUMMARY

The management and maintenance of IoT devices is a difficult challenge due to multiple factors, including the vast amount of IoT devices, their wide geographical spread, and their generally limited power consumption profile. Because many IoT devices have a limited power consumption (e.g., the devices must be operational for long periods of time using a single battery) and are remotely located (e.g. a remote sensor to monitor temperature and humidity levels in a forest) it not possible to equip the IoT device with the ability to communicate directly with a remote server (e.g., a centralized data collection server (DCS) or software administration server (SAS) that is located far away from the device).

This disclosure discloses systems and methods for overcoming the difficulties operators may face in managing and maintaining their large array of IoT devices. In some embodiments, the systems and methods rely on a crowd sourcing technique for managing and maintaining a large array of IoT devices. In the crowd sourcing technique, members of the public (hereafter "users") that have communication devices with short range wireless capabilities (e.g., Bluetooth) are provided with an opportunity to earn money (or other compensation) by allowing the operator of the IoT devices to effectively employ the user's communication device (UCD) as a gateway between an IoT device and a remote server. For example, in some embodiments, a user may download onto his or her communication device (e.g., smartphone) an app provided by the operator, which app is configured to automatically discover nearby IoT devices that require a SUP, obtain the SUP from a remote SAS, and then provide the SUP to the IoT device using a short range wireless signal.

Accordingly, in one aspect, there is provided a method for providing a SUP to an IoT device (e.g., a sensor for monitoring an environmental parameter or other device) via a user's communication device (UCD). In some embodiments, the method includes, the UCD automatically discovering that a SUP needs to be provided to the IoT device, and the UCD obtaining the SUP from a software administration system (SAS). The UCD transmits the SUP to the IoT device using a first short range wireless signal. After transmitting the SUP to the IoT device, the UCD receives confirmation data transmitted wirelessly by the IoT device using a second short range wireless signal. The confirmation data confirms that the IoT device received the SUP. The UCD then transmits the confirmation data to the SAS, which is located remotely from the UCD. In some embodiments, the confirmation data includes a digital signature generated by the IoT device using a private key and the SAS verifies the digital signature and provides a reward to a user of the UCD after verifying the digital signature.

In some embodiments, the step of automatically discovering that the SUP needs to be provided to the IoT device comprises: the UCD automatically broadcasting a device discovery message; and the UCD receiving from the IoT device a response message transmitted by the IoT device in response to the device discovery message, the response message comprising a device identifier allocated to the IoT device. In such an embodiments, the step of automatically discovering that the SUP needs to be provided to the IoT device may comprise: the UCD transmitting to the SAS the device identifier allocated to the IoT device in response to receiving the response message; and the UCD receiving from the SAS a software update message comprising information indicating that the IoT device requires a software update.

In some embodiments, the step of automatically discovering that the SUP needs to be provided to the IoT device comprises the UCD receiving a software update message transmitted by the SAS, the software update message comprising information indicating that an IoT device in the vicinity of the UCD requires a software update. In such embodiments, the method may further include: the SAS obtaining location information identifying a location of the UCD; the SAS using the location information to determine that the UCD is within the vicinity of an IoT device that requires a software update; and the SAS transmitting the software update message in response to determining that the UCD is within the vicinity of an IoT device that requires a software update.

In some embodiments, the method further comprises the UCD alerting a user of the UCD that an IoT device in the vicinity of the user requires a SUP and prompting the user to input information indicating whether or not the user agrees to allow the UCD to transmit the SUP to the IoT device in response to the UCD discovering that a SUP needs to be provided to the IoT device; and the UCD receiving from the user an input indicating that the user agrees to allow the UCD to transmit the SUP to the IoT device, wherein the UCD is configured such that it transmits the SUP to the IoT device if and only if the user agrees to allow the UCD to transmit the SUP to the IoT device.

In another aspect there is provided a method for a data collection server (DCS) to obtain data generated by an IoT device via a user communication device (UCD). In some embodiments the method includes the UCD transmitting a first message using a first short range wireless signal, wherein the first message is received by an IoT device that is configured to respond to the first message by transmitting a second message using a second short range wireless signal. The UCD receives the second short range wireless signal and obtains the second message therefrom, wherein the second message comprises a data set and a signature for verifying the authenticity of the data set. The method further includes the UCD forwarding the data set and signature to the DCS, wherein the DCS is located remotely from the UCD and the DCS is configured to use the signature to confirm that the data set received from the UCD is identical to the data set transmitted by the IoT device.

In some embodiments the first message is a discover message, which is not addressed to any specific IoT device. In other embodiments the first message is a request message addressed specifically to the IoT device.

In some embodiments, the method further includes transmitting a discovery message, which is not addressed to any specific IoT device, prior to transmitting the first message; receiving a response message transmitted by an IoT device in response to the discover message, the response message comprising a device identifier (DevID) allocated to the IoT device; in response to receiving the response message, asking the user of the UCD for permission to obtain data collected by the IoT device and forward the obtained data to the DCS; and transmitting the first message as a result of receiving said permission from the user.

The above and other aspects and embodiments are described below with reference to the accompanying drawings.

BRIEF DESCRIPTION OF DRAWINGS

The accompanying drawings, which are incorporated herein and form part of the specification, illustrate various embodiments.

DETAILED DESCRIPTION

Figure 1:
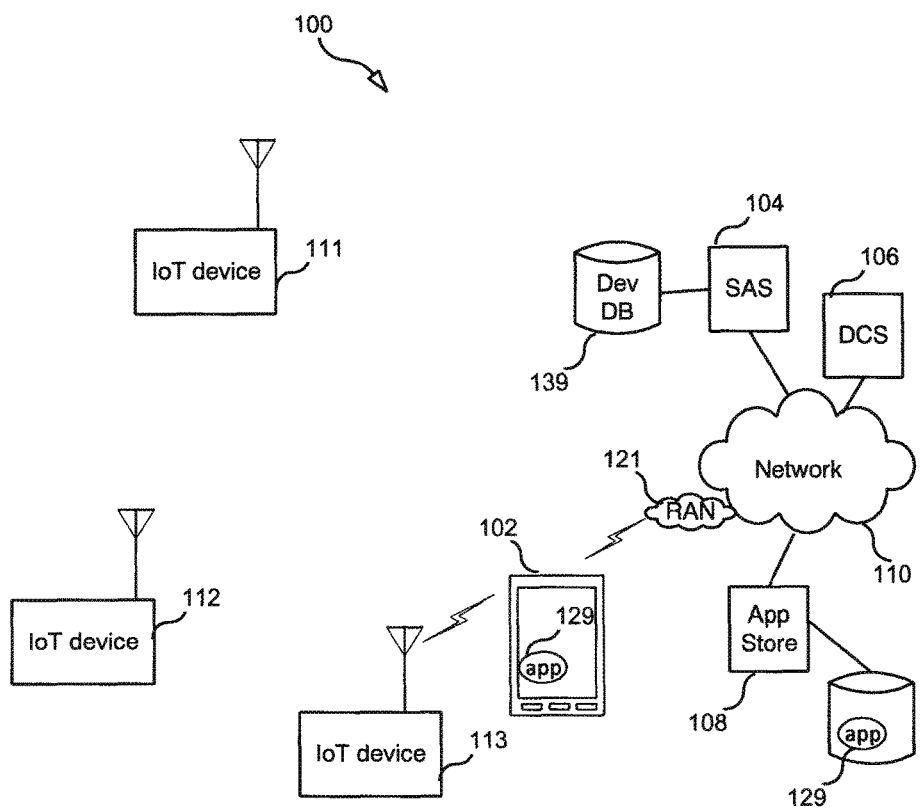
FIG. 1 illustrates a system according to some embodiments.

FIG. 1 illustrates a system 100 according to some embodiments. System 100 includes a set of IoT devices 111-113, a user's communication device (UCD) 102, a network 110 (e.g., the Internet), and one or more servers connected to the network. In this example, system 100 includes a software administration server (SAS) 104, a data collection server (DCS) 106, and an app store server 108. Each of the servers shown in FIG. 1 may comprise one or more server computers, which may be co-located or distributed.

As discussed above, an IoT device operator may be responsible for managing and/or maintaining IoT devices 111-113, which may be dispersed over a large geographic area. Additionally, each IoT device 111-113 may have communication capabilities that are capable of only short range communications. In such a scenario, it may be expensive for the operator to manage and maintain the IoT devices. For example, if the IoT devices require a software update package (SUP) (defined above), it would be costly and time consuming for the operator to send a technician into the field to manually update each IoT device. Accordingly, one solution to this problem is to use crowd sourcing. For example, the operator may release an app 129 that is freely available to any member of the public (hereafter "user"). A user can obtain the app 129 by visiting a conventional app store and downloading the app 129 to the user's communication device (e.g., UCD 102). In other embodiments, the app 129 may come pre-installed on UCD 102 or the app 129 may be built into the operating system for UCD 102.

Figure 2:
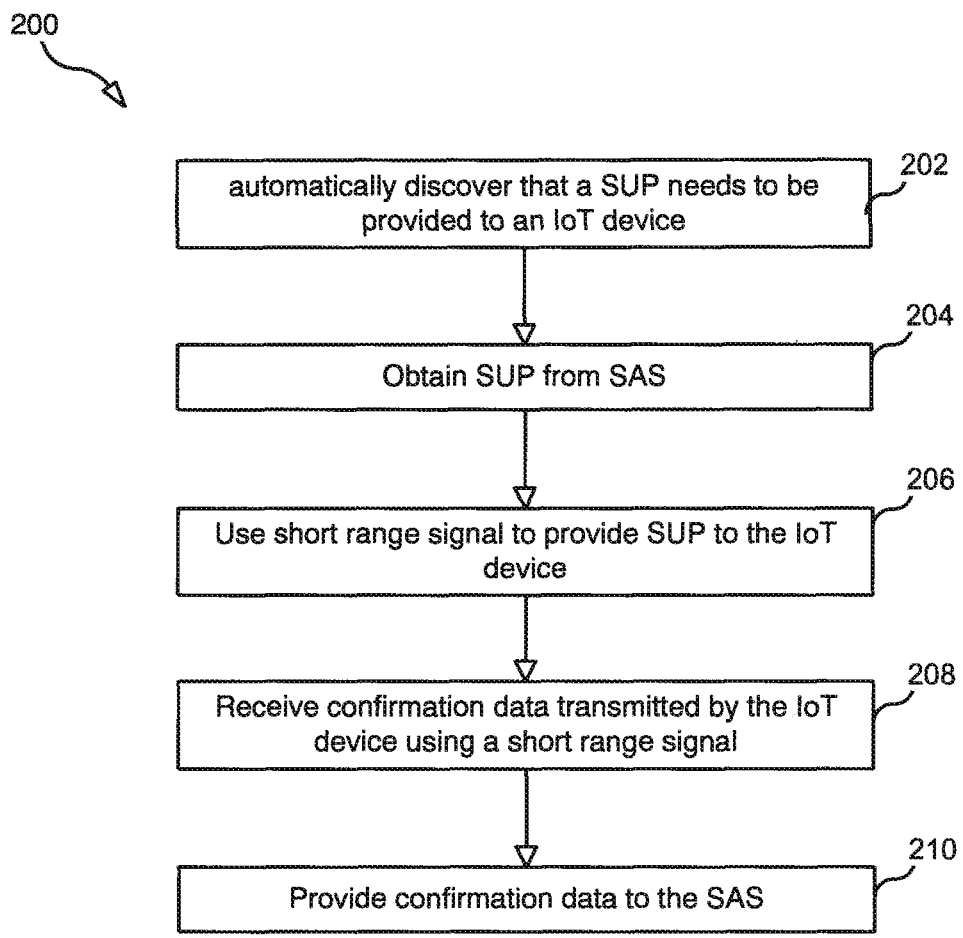
FIG. 2 is a flow chart illustrating a process according to some embodiments.

In some embodiments, the app 129 (regardless of how it is obtained) is configured to program to the UCD 102 to perform the process shown in FIG. 2.

Referring now to FIG. 2, FIG. 2 illustrates a process 200 according to some embodiments. Process 200 may begin with step 202, where UCD 102 automatically discovers that a SUP needs to be provided to an IoT device (e.g., IoT device 113).

Figure 3:
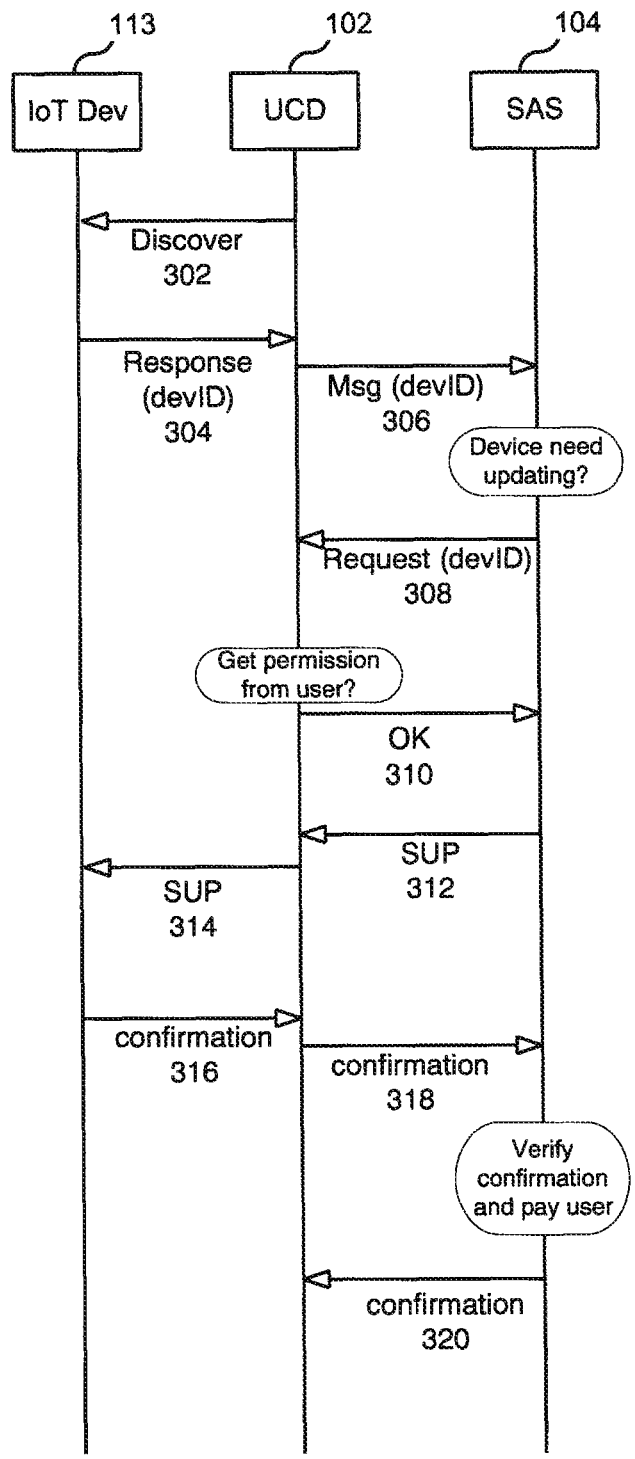
FIG. 3 is a message flow diagram illustrating an embodiment.

One way that UCD 102 performs step 202 is shown in FIG. 3. As shown in FIG. 3, UCD 102 may be configured by the app 129 to occasionally (e.g., periodically) wirelessly transmit a discover message 302 using a short range wireless communication protocol, such as Bluetooth or wireless personal area network (WPAN) protocols (e.g., IEEE 801.15.4.x or other WPAN protocols). Because discover message 302 is wirelessly transmitted it can be received by any IoT device that is within the vicinity of UCD 102 at the time the discover message was transmitted (e.g., within about 10 meters of UCD 102).

If an IoT device that is configured to recognize and respond to discover message 302 is within the vicinity of UCD 102, then the IoT device will transmit a response message 304 in response to the discover message 302, and UCD 102 should receive the response message 304. Response message 304 includes a unique device identifier (devID) that has been assigned to the IoT device.

In response to receiving response message 304, UCD 102 transmits to SAS 104 a message 306 comprising the received devID. For example, if UCD 102 is a smartphone, UCD 102 can transmit the message 306 via a radio access network 121 (e.g., a 4G LTE network, a WiFi network, etc.) connected (directly or indirectly) to network 110. However, in other embodiments, UCD 102 may be physically connected to network 110 (or physically connected to a network that is connected to network 110).

SAS 104, in response to receiving message 306 uses the devID included in the message to determine whether the IoT device to which the devID is assigned requires a SUP. For example, SAS 104 may maintain a IoT device database 139 that stores, for each of a plurality of IoT devices, a device record that contains the device's devID together with the date of last update and/or a software version number (or other information that can be used to determine whether the IoT device needs a SUP). As a result of determining that the IoT device associated with the received devID needs a SUP, SAS 104 transmits to UCD 102 a request message 308 containing the devID. This request message 308 indicates that the IoT device to which the devID is assigned needs a SUP.

Figure 4:
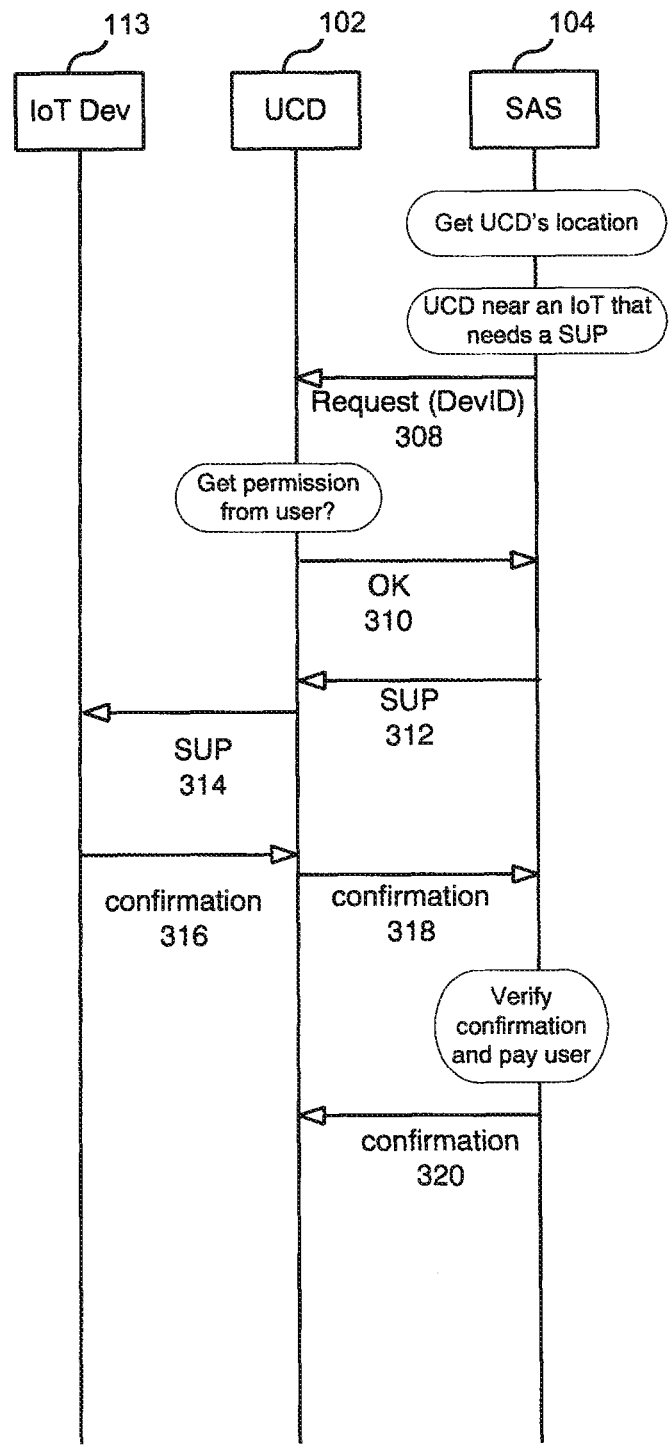
FIG. 4 is a message flow diagram illustrating another embodiment.

Another way that UCD 102 performs step 202 is shown in FIG. 4. As shown in FIG. 4, SAS 104 may be configured to obtain location information identifying the current location of UCD 102. For instance, the app 129 may be configured to occasionally transmit the location information to SAS 104, or SAS 104 may obtain the location information from a cellular network provider to which UCD 102 is subscribed. Once the location information is obtained, SAS can retrieve from its IoT device database 139 the locations of the IoT devices that need a SUP to determine whether UCD 102 is near one of the IoT devices. In response to determining that UCD 102 is near one of the IoT devices that needs a SUP, SAS 104 transmits to UCD 102 request message 308.

In some embodiments, UCD 102 does not automatically discover that a SUP needs to be provided to an IoT device (i.e., step 202 is not performed), but rather, in some embodiments, the user of UCD may manually select an IoT device from as set of IoT devices that need updating. For example, the user may request a map that indicates the location of IoT devices that need updating. Once the user has this map, the user may choose to travel to one or more of the IoT devices for the purpose of updating the IoT devices. This may be done as part of a game or a contest. For example, the user that updates the most IoT devices in a given period of time may receive a reward.

Referring back to FIG. 2, after UCD 102 automatically discovers an IoT device that needs updating (or the user manually determines the IoT device), UCD 102 performs step 204. In step 204, UCD 102 obtains from SAS 104 the SUP needed by the discovered/selected IoT device. In step 206, after obtaining the SUP from SAS 104, UCD 102 transmits the SUP to the IoT device using the short range wireless communication protocol discussed above (see FIG. 3 or FIG. 4, communication 314). That is, UCD 102 uses a short range wireless signal to provide the SUP to the IoT device.

In some embodiments, as shown in FIGS. 3 and 4, prior to obtaining the SUP from SAS 104 (or prior to performing step 206), UCD 102 asks the user of UCD 102 for permission to provide a SUP to the IoT device. For example, in response to receiving request 308, UCD 102 may display a message on a display screen of UCD 102 that requires the user to activate an "OK" button in order for UCD 102 to provide the SUP to the IoT device. In some embodiments, in response to the user giving his/her consent to continue with the IoT device update by activating the OK button, UCD 102 transmits an OK message 310 to SAS 104, which then causes SAS 104 to transmit to UCD 102 the required SUP (see message 312).

In some embodiments, the message displayed to the user provides to the user an estimate of how long it will take for UCD 102 to transmit the SUP to the IoT device and requests that the user remain stationary (or generally stationary) during the transfer. In addition, the message may inform the user that the user will receive a certain reward (e.g., a payment, credit, etc.) once SAS 104 confirms that the IoT device has successfully received the SUP. For instance, the message may state that the users will be given $5.00 as a reward for allowing the operator to employ the user's UCD 102 to provide the SUP to the IoT device.

Referring back to FIG. 2, after step 206 (i.e., after UCD 102 transmits the SUP to the IoT device), the IoT device transmits a confirmation message containing confirmation data (see FIGS. 3 and 4, message 316). In step 208, UCD 102 receives the confirmation message 316 containing the confirmation data, and, in step 210 transmits the confirmation data to SAS 104 (see FIGS. 3 and 4, message 318). The SAS 104 is configured to use the received confirmation data to verify that the SUP has been received successfully by the IoT device. In some embodiments, the confirmation data includes a digital signature generated by the IoT device using a private key (e.g., a private encryption key, a device serial number, etc.). In some embodiments, the IoT device uses a private encryption key and a checksum of the SUP to generate the digital signature. In such embodiments, the SAS 104 can verify the digital signature using, for example, a public encryption key corresponding to the private encryption key and the checksum, which are both known to SAS 104.

After verifying that the SUP has been received successfully by the IoT device by, for example, verifying the digital signature, the SAS 104 may provide the above mentioned reward to the user of UCD 102 and send a confirmation message 320 to UCD 102 indicating that the reward has been provided (or will be provided). SAS 104 may provide the award by depositing money into an account associated with UCD 102 and/or the user. In this way, user are given an incentive to help the operator maintain and manage the plethora of IoT devices that is tasked to maintain and manage.

Figure 5:
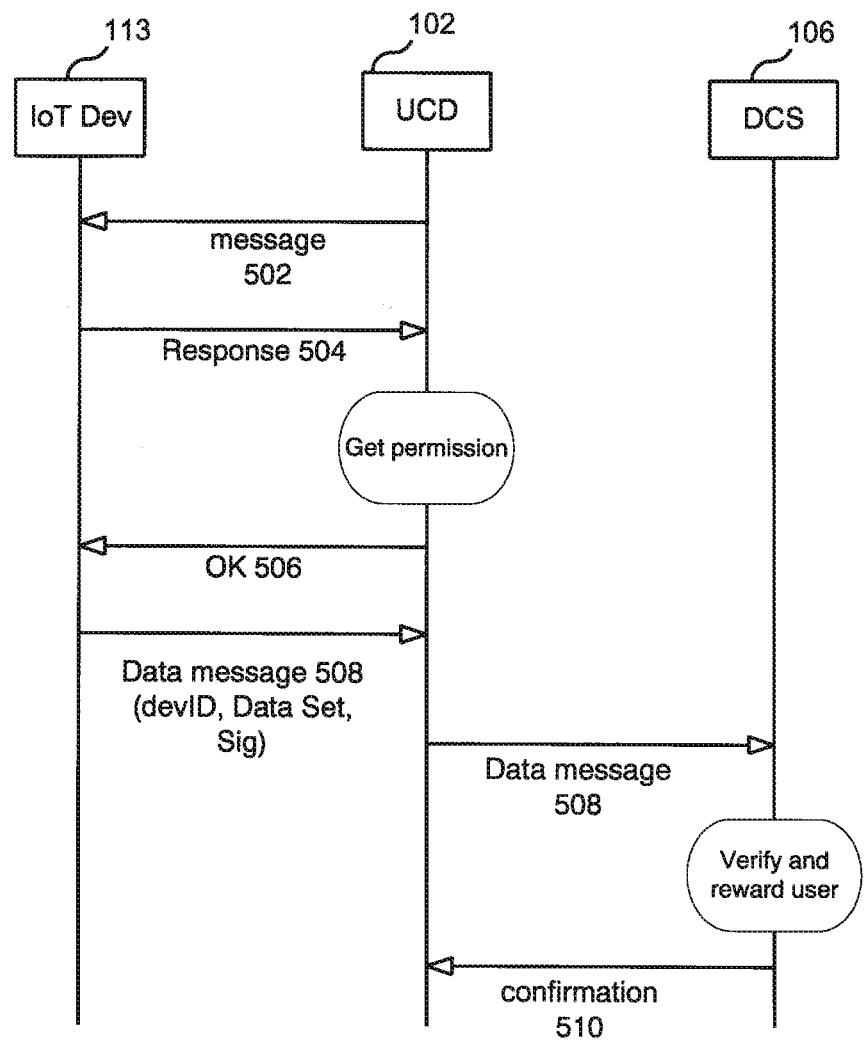
FIG. 5 is a message flow diagram illustrating another embodiment.

Referring now to FIG. 5, FIG. 5 is a message flow diagram showing an embodiment where a UCD is used to i) obtain data that has been obtained by an IoT device (e.g., temperature data based on temperature sensor readings made by the IoT device) and ii) forward the obtained data to DCS 106.

As illustrated in FIG. 5, UCD 102 transmits a message 502 that is received by IoT device 113. Message 502 may be a discover message 302 or it may be a unicast message addressed specifically to IoT device 113. In the embodiments where message 502 is message addressed specifically to IoT device 113, UCD 102 may have previously obtained the DevID of IoT device from a message transmitted by DCS 106. For example, like SAS 104, DCS 106 may send to UCD a request message (e.g. request message 308) containing the DevID as a result of discovering, based on obtained location information, that UCD 102 is close to the IoT device.

In response to message 502, IoT device 113 transmits a response message 504, which response message may include a device identifier (DevID) that is allocated to IoT device 113. This response message 504 is received by UCD 102. In response to receiving the response message 504, UCD 102 asks the user of the UCD for permission to obtain data collected by the IoT device and forward the obtained data to the DCS 106. As a result of receiving the permission, UCD 102 transmits a message 506 to IoT device 113. Preferably, message 506 is transmitted using a short range wireless signal. Message 506 is received by IoT device 113, which is configured to respond to message 506 by transmitting a data message 508 using a second short range wireless signal. Data message 508, in some embodiments, includes a data set comprising data collected by IoT device 113 and a signature for verifying the authenticity of the data set. UCD 102 receives the second short range wireless signal and obtains therefrom message 508. Next, UCD 102 forward the received data set and signature to the DCS. Preferably, the DCS is configured to use the signature to confirm that the data set received from the UCD is identical to the data set transmitted by the IoT device. As a result of confirming the authenticity of the data set, DCS 106 may send a confirmation message 510 to UCD 102 and provide a reward to the user of UCD 102. In this way, an operator of IoT devices can use crowd sourcing to obtain data from the IoT devices.

Figure 6:
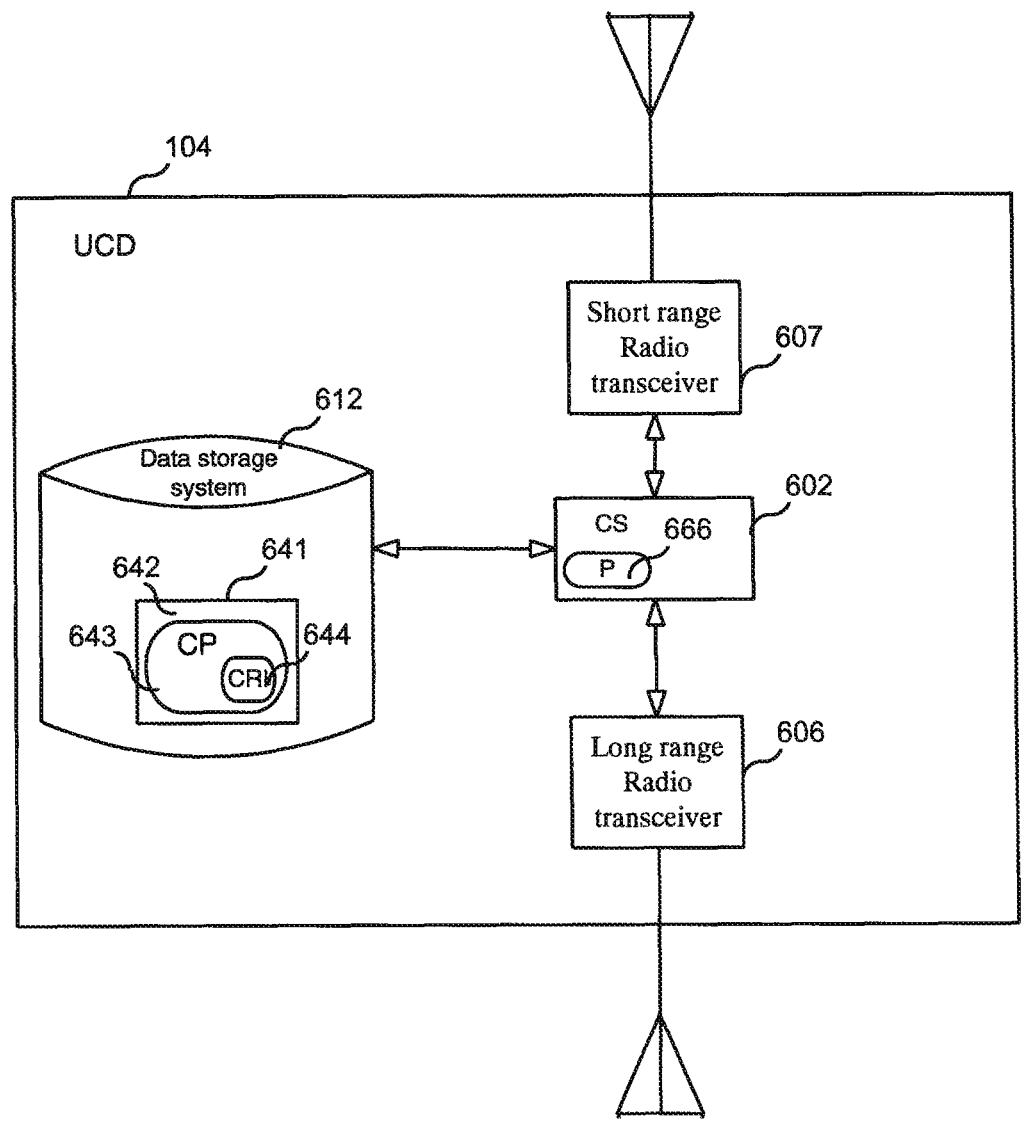
FIG. 6 is a block diagram of a base station, according to some embodiments.

FIG. 6 is a block diagram of UCD 102 according to some embodiments. As shown in FIG. 6, UCD 102 may include or consist of: a computer system (CS) 602, which may include one or more processors 666 (e.g., a microprocessor) and/or one or more circuits, such as an application specific integrated circuit (ASIC), field-programmable gate arrays (FPGAs), a logic circuit, and the like; a first radio transceiver 606 (e.g., a transceiver for a 4G cellular network) for enabling UCD 102 to communicate with RAN 121 (e.g., a base station of RAN 121); a second radio transceiver 607 (e.g., Bluetooth, WPAN, etc.) for enabling UCD 102 to communicate with an IoT device using short range wireless signals; and a data storage system 612, which may include one or more non-volatile storage devices and/or one or more volatile storage devices (e.g., random access memory (RAM)).

In embodiments where UCD 102 includes a processor 666, a computer program product (CPP) 641 may be provided. CPP 641 includes or is a computer readable medium (CRM) 642 storing a computer program (CP) 643 comprising computer readable instructions (CRI) 644 for performing steps described herein (e.g., one or more of the steps shown in the flow charts). CP 643 may include an operating system (OS) and/or application programs. CRM 642 may include a non-transitory computer readable medium, such as, but not limited, to magnetic media (e.g., a hard disk), optical media (e.g., a DVD), solid state devices (e.g., random access memory (RAM), flash memory), and the like.

In some embodiments, the CRI 664 of CP 663 is configured such that when executed by computer system 602, the CRI causes UCD 102 to perform steps described above (e.g., steps described above and below with reference to the flow charts shown in the drawings). In other embodiments, the UCD 102 may be configured to perform steps described herein without the need for a computer program. That is, for example, computer system 602 may consist merely of one or more ASICs. Hence, the features of the embodiments described herein may be implemented in hardware and/or software.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for providing a software update package (SUP) to an Internet of Things (IoT) device via a user's communication device (UCD), the method comprising:
   the UCD automatically discovering that the SUP needs to be provided to the IoT device;
   the UCD obtaining the SUP from a software administration server (SAS);
   the UCD transmitting the obtained SUP to the IoT device using a first short range wireless signal;
   after transmitting the SUP to the IoT device, the UCD receiving confirmation data transmitted wirelessly by the IoT device using a second short range wireless signal, wherein the confirmation data includes a digital signature generated by the IoT device using a private key and a checksum of the SUP, the confirmation data confirming that the IoT device received the SUP;
   updating software of the IoT device using the SUP; and
   the UCD transmitting the confirmation data to the SAS, wherein the SAS is located remotely from the UCD;
   wherein the step of automatically discovering that the SUP needs to be provided to the IoT device comprises:
   the UCD automatically broadcasting a device discovery message;
   the UCD receiving from the IoT device a response message transmitted by the IoT device in response to the device discovery message, the response message comprising a device identifier allocated to the IoT device;
   the UCD transmitting to the SAS the device identifier allocated to the IoT device in response to receiving the response message from the IoT device; and
   the UCD receiving from the SAS a software update message comprising information indicating that the IoT device requires a software update.

2. The method of claim 1, further comprising:
   in response to the UCD discovering that the SUP needs to be provided to the IoT device, the UCD alerting a user of the UCD that the UCD is in the vicinity of the IoT device that requires the SUP and prompting the user to input information indicating whether or not the user agrees to allow the UCD to transmit the SUP to the IoT device; and
   the UCD receiving from the user an input indicating that the user agrees to allow the UCD to transmit the SUP to the IoT device, wherein
   the UCD is configured such that it transmits the SUP to the IoT device if and only if the user agrees to allow the UCD to transmit the SUP to the IoT device.

3. The method of claim 2, wherein the UCD alerting the user of the UCD that the UCD is in the vicinity of the IoT device that requires the SUP further comprises:
   displaying a message to the user that includes an estimate of time the UCD requires to transmit the SUP to the IoT device; and
   requesting the user to remain stationary during the transmittal of SUP from the UCD to the IoT device.

4. The method of claim 1, wherein the confirmation data includes a digital signature generated by the IoT device using a private key.

5. The method of claim 4, wherein
   the SAS verifies the digital signature; and
   the SAS provides a reward to a user of the UCD.

6. The method of claim 1, wherein the IoT device is a sensor for monitoring an environmental parameter.

7. The method of claim 1, further comprising:
   the SAS determining that the IoT device requires the SUP, in response to receiving the device identifier allocated to the IoT device transmitted by the UCD.

8. The method of claim 7, further comprising:
   the SAS transmitting, to the UCD, a request message indicating that the IoT device to which the device identifier is allocated requires the SUP.

9. A user's communication device (UCD) for providing a software update package (SUP) to an Internet of Things (IoT) device, the UCD comprising:
   a first transceiver; a second transceiver; and a computer system, wherein the computer system is configured to:
   automatically discover that the SUP needs to be provided to the IoT device by broadcasting a device discovery message and receiving from the IoT device a response message transmitted by the IoT device in response to the device discovery message, the response message comprising a device identifier allocated to the IoT device;

employ the first transceiver to transmit to a software administration server (SAS) the device identifier allocated to the IoT device in response to receiving the response message;

employ the first transceiver to obtain the SUP from the SAS located remotely from the UCD;

employ the second transceiver to transmit the obtained SUP to the IoT device using a first short range wireless signal; and employ the first transceiver to transmit, to the SAS, confirmation data transmitted wirelessly by the IoT device using a second short range wireless signal and received by the UCD via the second transceiver, wherein the confirmation data includes a digital signature generated by the IoT device using a private key and a checksum of the SUP, the confirmation data confirming that the IoT device received the SUP; and update software of the IoT device using the SUP.

10. The UCD of claim 9, wherein the computer system is further configured to alert a user of the UCD that the UCD is in the vicinity of the IoT device that requires the SUP and prompting the user to input information indicating whether or not the user agrees to allow the UCD to transmit the SUP to the IoT device in response to the UCD discovering that the SUP needs to be provided to the IoT device.

11. The UCD of claim 9, wherein the confirmation data includes a digital signature generated by the IoT device using a private key.

12. A method for a software administration server (SAS) to provide a software update package (SUP) to an Internet of Things (IoT) device via a user's communication device (UCD), the method comprising:

the UCD automatically discovering that the SUP needs to be provided to the IoT device by broadcasting a device discovery message and receiving from the IoT device a response message transmitted by the IoT device in response to the device discovery message, the response message comprising a device identifier allocated to the IoT device;

the UCD transmitting to the SAS the device identifier allocated to the IoT device in response to receiving the response message from the IoT device;

the UCD receiving from the SAS, a software update message comprising information Indicating that the IoT device requires a software update;

the UCD obtaining the SUP from the SAS, which is located remotely from the UCD;

the UCD transmitting the obtained SUP to the IoT device using a first short range wireless signal;

after transmitting the SUP to the IoT device, the UCD receiving confirmation data transmitted wirelessly by the IoT device using a second short range wireless signal, wherein the confirmation data includes a digital signature generated by the IoT device using a private key and a checksum of the SUP, the confirmation data confirming that the IoT device received the SUP;

updating software of the IoT device using the SUP;

the UCD transmitting the confirmation data to the SAS;

the SAS verifying the digital signature; and the SAS providing a reward to a user of the UCD as a result of verifying the digital signature.

13. A system for providing a software update package (SUP) to an Internet of Things (IoT) device, the system comprising:

a software administration server (SAS); and a user's communication device (UCD) comprising a processor and a non-transitory computer readable medium storing a computer program comprising computer readable Instructions which when executed by the processor, causes the processor to:

automatically discover that the SUP needs to be provided to the IoT device by broadcasting a device discovery message and receiving from the IoT device a response message transmitted by the IoT device in response to the device discovery message, the response message comprising a device identifier allocated to the IoT device;

transmit, to the SAS, the device identifier allocated to the IoT device, in response to receiving the response message from the IoT device;

obtain the SUP from the SAS, which is located remotely from the UCD;

transmit the SUP to the IoT device using a first short range wireless signal;

after transmitting the SUP to the IoT device, receive confirmation data transmitted wirelessly by the IoT device using a second short range wireless signal, the confirmation data confirming that the IoT device received the SUP;

transmit the confirmation data to the SAS, wherein the confirmation data includes a digital signature generated by the IoT device using a private key and a checksum of the SUP; and updating software of the IoT device using the SUP;

wherein the SAS is configured to: verify the digital signature; and provide a reward to a user of the UCD as a result of verifying the digital signature.

* * * * *